Nov. 10, 1970    R. H. MUNCH    3,538,747

CAVITATION MEASUREMENT METHOD

Filed Jan. 22, 1968

INVENTOR
RALPH H. MUNCH

BY *William H. Duffey*

ATTORNEY

United States Patent Office 3,538,747
Patented Nov. 10, 1970

3,538,747
CAVITATION MEASUREMENT METHOD
Ralph H. Munch, Webster Groves, Mo., assignor to Monsanto Company, St. Louis, Mo., a corporation of Delaware
Filed Jan. 22, 1968, Ser. No. 699,667
Int. Cl. G01n 9/00, 11/00
U.S. Cl. 73—53                                          10 Claims

ABSTRACT OF THE DISCLOSURE

Method and apparatus for measuring the energy emanating from a cavitating fluid. Cavitation energy is converted into electrical pulses, the height of the pulses is discriminated by pulse height analysis, and the number or rate of pulses produced within a determined range of pulse heights is observed.

---

This invention relates to the analysis of fluid cavitation. More specifically, it relates to the use of pulse height analysis and counting techniques for determining the intensity of cavitation in a fluid system.

Cavitation may be defined as the formation of bubbles of gas or vapor in a liquid due to localized low pressure areas caused by relative motion of a liquid and a solid. The bubbles normally contain desorbed gases as well as vaporized liquid. Nucleation of a bubble is generally believed to occur at a microscopic discontinuity in the liquid continuum. The discontinuity may be caused by stable micro-bubbles, solid particles, particle-bubble combinations, immiscible micro-droplets or active sites on solid bounding surfaces. The bubble nucleus, therefore, is regarded as a weak spot in the liquid where rupture will occur under stress.

Unless there is gas in solution in the liquid, cavitation cannot occur above the liquid's bubble point, which is the vapor pressure of the liquid at the temperature in question. Bubbles can be formed, however, when the fluid is at or below its bubble point pressure. As the bubbles later reach a point of higher pressure, a violent collapse occurs, thereby producing shock waves which can be severe enough to damage the mechanical members in contact with the fluid. Pressure changes sufficient to cause cavitation can occur in several ways. For example, a fluid flowing through a restriction, such as a partly closed valve, can encounter, at the point of highest velocity, a pressure far lower than both the bubble point pressure and the valve outlet pressure.

Cavitation damage is most often characterized by physical alteration of the surface contacted by the shock waves produced by the collapsing bubbles. Such alteration can range from subtle deformation of the surface geometry to serious erosion of the material. While there are many undesirable results caused by cavitation damage, one important aspect of the problem is the effect on hydraulic systems. For example, the mechanical parts of a hydraulic system, such as pumps and valves, can experience a marked change in performance as the geometry of the parts is altered through cavitation damage. Such physical changes in pumps can cause a decrease in pumping efficiency, and, in the case of valves, can cause faulty operation, excessive leakage, or even hazardous conditions. As a result, cavitation damage necessitates premature overhaul or replacement of mechanical parts which is both costly and time consuming. In addition, the erosion of metal from mechanical parts in contact with the functional fluid contaminates the fluid, requiring premature draining of the fluid from the system. Further effects are clogging of the system filter, excessive filter replacement, and changes in the physical and chemical properties of the fluid. Metal contaminants can reduce the oxidative stability of a fluid, thereby adversely affecting fluid performance.

Cavitation damage has recently become an issue of substantial concern in aircraft hydraulic systems. Most modern multi-engine aircraft employ hydraulic servo-control systems to position flight control surfaces such as rudders, ailerons, and air brakes, as well as to perform other functions. These systems are simple, powerful and precise. They consist of a fluid reservoir, fluid pumps, filter, servo-valves, actuators, and associated parts. These systems are designed for the ultimate in reliability because of the critical importance of the function.

Substantial effort has been expended to reduce or eliminate cavitation damage in hydraulic systems, particularly aircraft hydraulic systems where critical safety features might be in jeopardy. One major approach to this problem is to discover fluid formulations which have reduced tendencies toward cavitation. When superior fluid base stocks or superior formulations are discovered, however, they cannot be immediately employed because aircraft certification regulations prohibit flight testing of newly designed fluids until a thorough ground testing program has demonstrated the fluid's capabilities. Laboratory and bench test procedures, therefore, are necessary to screen fluid candidates in order to single out and qualify those with improved properties.

Although there are several known bench test methods for evaluation of cavitation damage, there has remained a long-standing need for a superior method of electrically measuring cavitation impulses.

Prior to the outstanding discovery of the present invention, the traditional method of electrically studying cavitation energy has been to convert the sonic noise emanating from cavitation action to electrical signals, using appropriate pickups. The electrical signals are either measured by some device which produces an average reading, or the signals are studied by means of a wave analyzer to determine the relative intensity of the sonic energy as a function of frequency. Wave analyzers operate on the assumption that any periodic electrical signal can be synthesized by adding periodic functions of higher frequencies. Those who have used this approach report that cavitation signals consist mainly of "white noise" with a cut-off frequency varying from one experimenter to the next. This suggests that the results are characteristic of the measuring instruments rather than the cavitating system itself.

In the present invention it was discovered that sonic energy from a cavitating fluid system consists of pulses of random amplitude and random spacing in time. It was further found that these pulses have a time duration of the order of two microseconds. The traditional wave analyzer technique, therefore, is not the optimum means for measurement of cavitation energy signals because the latter are impulses of random amplitude and random frequency.

A remarkably improved method of measuring cavitation energy is provided by the present invention. It has herein been discovered that a more definitive measurement of cavitation energy can be attained through use of pulse height analysis and counting techniques. By directing the cavitation energy impulses to a pulse height analyzer which cooperates with a counter device, a substantially improved method of analysis is afforded. The method and apparatus of the present invention are adaptable not only to laboratory devices employed for cavitation study, but also to any fluid system wherein cavitation is likely to occur.

It is thus an object of the present invention to provide a method and apparatus for improved evaluation of cavitation energy. Another object of the present invention is to substantially improve the effectiveness of cavitation test devices by providing more definitive electrical measurements. Still another object of the present invention is to provide an electrical means of accurately measuring cavitation energy both in bench test devices as well as full scale fluid systems.

Other aspects, objects and advantages of this invention will become apparent from a consideration of the accompanying disclosure, drawing, and appended claims.

Broadly stated, the present invention employs pulse height analysis and counting techniques for meaningful measurement and analysis of energy emanating from fluid cavitation. By observing the cavitation energy experienced with various test fluids, it is now possible to evaluate the tendency of any given fluid to damage the parts of a hydraulic system during actual operation. Similarly, for a given fluid, it is possible to evaluate changes in cavitation activity produced by alterations in the hydraulic system components such as valve construction, metallurgy, flow restrictions, geometry changes and the like. Results obtained by pulse height analysis have been found to correlate well with other cavitation measurement parameters such as metal erosion and visual observation means.

Figure 1:
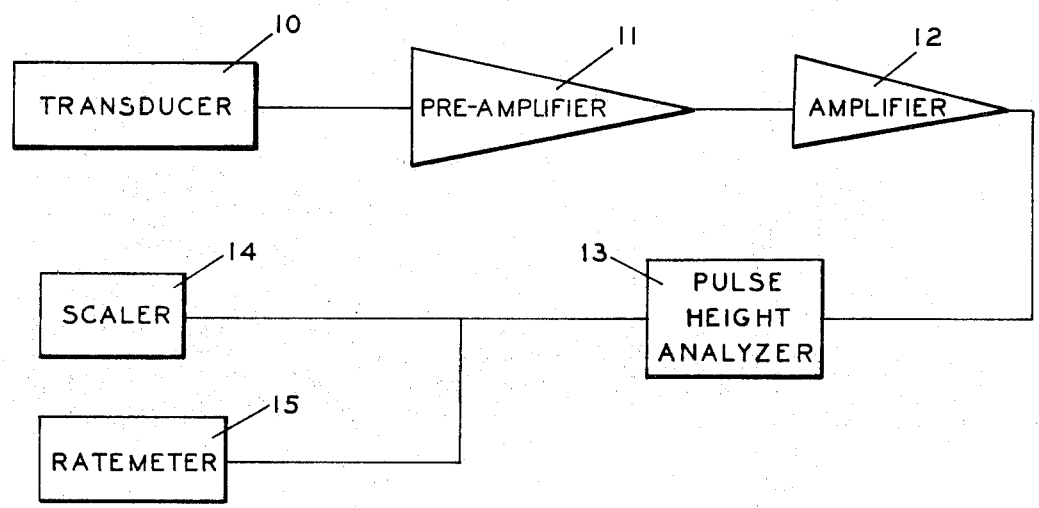
FIG. 1 is a block diagram of a pulse height analyzer system within the teachings of the present invention.

By reference to FIG. 1 of the drawing, a block diagram of the electrical components of a pulse analyzer system of the present invention can be seen. Reference numeral 10 refers to the pickup device which communicates with the cavitation impulses originating in the test system. It has been found that a quartz crystal transducer is advantageous as a pickup member. However, any type of transducer which has sufficiently high sensitivity and speed of response may be employed. The electrical output of transducer 10 is directed to pre-amplifier 11. The function of pre-amplifier 11 is that of impedance matching and minimizing pickup of stray noises. The electrical signal is then conveyed to amplifier 12, conveniently a 60 decibel unit. The electrical output from amplifier 12 is channeled to pulse height analyzer 13 which discriminates the height of the cavitation pulses according to a predetermined setting. The signal is then transferred to scaler 14 which counts the pulses in various pulse height categories or to a ratemeter 15 which measures the pulse rate in each pulse height category.

Figure 2:
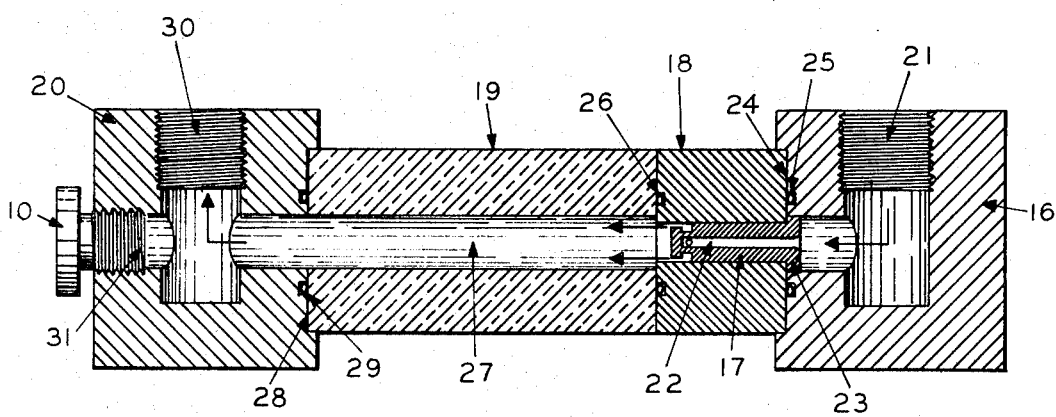
FIG. 2 is a fully sectioned elevation view of a typical cavitation test device adaptable to the pulse height measurement method of the present invention.

By reference to FIG. 2 of the drawing, a typical cavitation test device adaptable to the pulse height analysis method of the present invention can be seen in full section view. The illustrated test device is composed of five main parts, viz, inlet plenum 16, orifice plug 17, orifice spool 18, observation body 19, and outlet plenum 20. cooperating with the test device, although not shown in the drawing, is a fluid supply system of the type well known to those skilled in the art. Such a system typically includes a fluid reservoir, heat exchanger, pressure pump, scavenge pump, temperature controller, inlet and outlet pressure controllers, filter, and flowmeter.

With continued reference to FIG. 2 all parts other than inlet plenum 16, and outlet plenum 20 are substantially cylindrical in shape, i.e., having a circular cross-section. The plenums were given a rectangular shape to facilitate clamping of the assembly. Plenums 16 and 20 are made of stainless steel; orifice plug 17 is made of hard metal such as tool steel having a hardness of 60 Rockwell "C." Orifice spool 18 is made from a soft material such as aluminum in order to readily exhibit cavitation erosion. Observaton body 19 can be made of transparent material such as sapphire or plastic to permit visual study during operation. Sapphire is desirable because of its high rupture strength and resistance to heat and corrosive attack. A metal such as steel can be employed if it is not desired to visually observe cavitation action.

With further reference to FIG. 2, inlet plenum 16 contains a threaded aperture 21 which allows the test fluid to fill the plenum prior to entering axial passage 22 in orifice plug 17. The flow arrows indicate direction of flow. Orifice plug 17 features flanged end 23 to maintain axial positioning. An axial hole through the center of spool 18 serves to pilot orifice plug 17.

Spool 18 is located radially by means of counterbore 24 on the inboard face of inlet plenum 16. Fluid leakage across the face of counterbore 24 is prevented by O-ring 25. At the opposite end of spool 18 where observation body 19 abuts, O-ring 26 is provided to prevent escape of the test fluid.

Continued reference to FIG. 2 will illustrate that bore 27 of observation body 19 is made substantially larger than that of spool 18 to eliminate localized back pressure effects on the orifice system. At the downstream end of observation body 19, counterbore 28 and O-ring 29 in outlet plenum 20 perform the same piloting and sealing functions previously described for the inlet plenum location. Test fluid is allowed to discharge back to the supply system through threaded aperture 30 in outlet plenum 20. A special instrumentation fitting 31, a threaded port, is provided in the outboard wall of outlet plenum 20 to accommodate transducer 10, herein a quartz crystal transducer, for pulse height analysis of cavitation shock and vibration. Transducer 10 cooperates with the system illustrated in FIG. 1 to comprise the teachings of the present invention. The assembled parts shown in FIG. 2 can be clamped together by any means capable of withstanding the pressure reactions. Tie bolts have been employed with success.

The test device of FIG. 2 induces cavitation in the following manner. The fluid pressure within inlet plenum 16 is elevated to a level which causes sufficient pressure drop through orifice plug 17 to create fluid cavitation immediately downstream of plug 17. The geometry of plug 17 and the annular clearance between the downstream shoulder of plug 17 and the bore of spool 18 create the required flow restriction to induce cavitation under certain conditions of system pressure and temperature. Cavitation occurs downstream of orifice plug 17 because the localized fluid pressure becomes less than the vapor pressure or bubble point pressure of the test fluid.

The device of FIG. 2, therefore, provides a controllable source of cavitation useful for laboratory evaluation of fluid cavitation. The acoustical energy or cavitation pulses induced therein are communicated to transducer 10 for evaluation by the pulse height analysis method of the present invention. The analysis method of the present invention is by no means limited to a source of cavitation developed by a device such as that illustrated in FIG. 2. In practicing the outstanding method of the present invention it is only necessary that there be a source of cavitation capable of being sensed by a transducer or an equivalent pickup means.

The cavitation source exemplified by the device of FIG. 2, cooperating with the measuring apparatus of FIG. 1, provides a superior cavitation measuring system.

A transducer, as used herein, is a device which converts mechanical vibrations into electrical signals for amplification and recognition. In the present invention, the transducer serves to convert acoustic energy, i.e., pressure pulses, into electrical energy. Transducers are usually piezoelectric, electrostatic or magnetic devices. Any transducer with sufficient speed of response and sensitivity can be employed herein. Magnetostrictive transducers have been widely used for conversion of electric energy to sonic energy. Magnetostrictive materials, however, are not widely used in converting from sonic energy to electric energy, as in the cavitation conditions of the instant case. In addition to the well known quartz piezoelectric transducer material, several ceramic materials have been recently employed. Because cavitation impulses are of such short duration, it is necessary that the transducer have high sensitivity and high speed of response.

With reference again to FIG. 1 of the drawing, the scaler 14 is an electrical device which counts each pulse. Once the number of pulses over a measured period of time is known, the average counting rate is obtained by simple division. If the rate of pulse production were always low the pulses could be satisfactorily counted by a fast mechanical counter, but such devices cannot accommodate high counting rates. For counts above that which a counter can follow, therefore, a ratemeter can be employed.

Again referring to FIG. 1, ratemeter 15 is a device which indicates the average counting rate directly without requiring separate measurements of the number of counts and the time. The ratemeter smooths out the succession of randomly spaced pulses into a steady current whose magnitude is proportional to the average rate of pulse production. The most important function of a ratemeter is its ability to follow changes in the average counting rate, a function which the scaler is unable to perform.

The function of pulse height analyzer 13 shown in the block diagram of FIG. 1 is to determine the amplitude distribution of the pulses presented to it. The simplest type is the single-channel analyzer which accepts pulses whose amplitudes lie between an arbitrarily chosen value and a slightly higher value, ignoring all pulses above or below these limits. A multiple-channel analyzer, which permits counting pulses within several pulse height ranges simultaneously, affords faster analysis.

There are numerous ways of displaying the output signal derived from the method of the present invention. For example, a single-channel pulse height analyzer can be used in combination with any type of electronic or electromechanical counter or with a ratemeter. If a multiple-channel pulse height analyzer is used, a pulse height distribution curve can be displayed on a cathode ray oscilloscope or plotted by means of a recording potentiometer.

Figure 3:
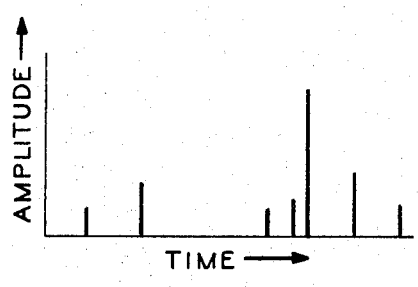
FIG. 3 is a facsimile of a typical oscilloscope display showing the random amplitude and random spacing of cavitation energy impulses.

FIG. 3 of the drawing illustrates the random amplitude and random spacing of cavitation energy impulses as displayed on a cathode ray oscilloscope. Because of the random nature of the cavitation impulses, the remarkable advantages afforded by pulse height analysis are readily apparent.

It is to be understood that the means and methods of the present invention are susceptible to numerous variations from the preferred embodiment disclosed herein. Those skilled in the electrical instrumentation art will find various ways of attenuating the pulse signal from cavitation activity and resolving it for pulse height analysis. Similarly, those skilled in the mechanical and hydraulic arts will be aware of numerous means of artificially inducing cavitation in a fluid system. The pulse height analysis technique taught by the present invention is intended to apply to all natural or artificially induced cavitation test methods as well as prototype or production hydraulic systems in which cavitation may originate.

While this invention has been described with respect to certain specific embodiment, it is not so limited and it is to be understood that variations and modifications thereof may be made without departing from the spirit or scope of the following claims.

The embodiments of this invention in which an exclusive property or privilege is claimed are defined as follows:

1. A method of measuring fluid cavitation which comprises the steps of:
    (a) converting cavitation energy into electrical pulses;
    (b) discriminating the height of said pulses by pulse height analysis;
    (c) counting the number of pulses produced within a determined range of pulse heights.

2. A method of measuring fluid cavitation which comprises the steps of:
    (a) converting cavitation energy into electrical pulses;
    (b) discriminating the height of said pulses by pulse height analysis; and
    (c) measuring the rate of pulse production within a determined range of pulse heights.

3. A cavitation measuring system which comprises:
    (a) a source of cavitation energy;
    (b) sensor means adapted to convert said energy into electrical pulses;
    (c) a pulse height analyzer adapted to discriminate the height of said pulses; and
    (d) counter means adapted to count the number of pulses produced within a determined range of pulse heights.

4. A system of claim 3 wherein the counter means is a scaler.

5. A cavitation measuring system which comprises:
    (a) a source of cavitation energy;
    (b) sensor means adapted to convert said energy into electrical pulses;
    (c) a pulse height analyzer adapted to discriminate the height of said pulses; and
    (d) rate measuring means adapted to measure the rate of pulse production within a determined range of pulse heights.

6. A system of claim 5 wherein the rate measuring means is a ratemeter.

7. A cavitation test device which comprises:
    (a) sensor means adapted to sense cavitation energy pulses;
    (b) amplifier means cooperating with said sensor means;
    (c) a pulse height analyzer; and
    (d) counter means adapted to count the number of pulses produced within a determined range of pulse heights.

8. A device of claim 7 wherein the sensor means is a transducer.

9. A cavitation test device which comprises:
    (a) sensor means adapted to sense cavitation energy pulses;
    (b) amplifier means cooperating with said sensor means;
    (c) a pulse height analyzer; and
    (d) rate measuring means adapted to measure the rate of pulse production within a determined range of pulse heights.

10. A device of claim 9 wherein the sensor means is a transducer.

References Cited
UNITED STATES PATENTS 3,381,525   5/1968   Kartluke _____ 73—53 X RICHARD C. QUEISSER, Primary Examiner C. E. SNEE III, Assistant Examiner U.S. Cl. X.R.

73—32